United States Patent [19]
Jones et al.

[11] Patent Number: 5,307,185
[45] Date of Patent: Apr. 26, 1994

[54] LIQUID CRYSTAL PROJECTION DISPLAY WITH COMPLEMENTARY COLOR DYE ADDED TO LONGEST WAVELENGTH IMAGING ELEMENT

[75] Inventors: Philip J. Jones, Menlo Park; Wayne Montoya, Newark; Hundi P. Kamath, Los Altos; Akira Tomita, Redwood City, all of Calif.

[73] Assignee: Raychem Corporation, Menlo Park, Calif.

[21] Appl. No.: 886,003

[22] Filed: May 19, 1992

[51] Int. Cl.⁵ .................. G02F 1/1333; H04N 9/31
[52] U.S. Cl. ................................. 359/41; 359/51; 359/98
[58] Field of Search ............ 359/40, 48, 41, 49, 359/51, 55, 52, 57, 96, 71, 98, 102; 353/31, 34, 122

[56] References Cited

U.S. PATENT DOCUMENTS

| | | | |
|---|---|---|---|
| 4,541,693 | 9/1985 | Knoll et al. | 359/98 |
| 4,613,207 | 9/1986 | Fergason | 359/51 |
| 4,662,720 | 5/1987 | Fergason | 350/339 F |
| 4,838,660 | 6/1989 | Fergason | 350/339 F |
| 4,856,876 | 8/1989 | Fergason | 350/350 F |
| 4,878,741 | 11/1989 | Fergason | 350/339 F |
| 4,953,953 | 9/1990 | Fergason | 350/339 F |
| 5,016,984 | 5/1991 | Fergason | 350/334 |
| 5,022,750 | 6/1991 | Flasck | 353/31 |
| 5,024,524 | 6/1991 | Flasck | 353/31 |
| 5,103,327 | 4/1992 | Hirai et al. | 359/51 |
| 5,150,232 | 9/1992 | Gunkima et al. | 359/81 |
| 5,206,747 | 4/1993 | Wiley et al. | 359/98 |

FOREIGN PATENT DOCUMENTS

| | | | |
|---|---|---|---|
| 0473090A3 | 3/1992 | European Pat. Off. | |
| 0257123 | 11/1987 | Japan | 359/98 |
| 0301022 | 12/1988 | Japan | 359/96 |
| 0287830 | 11/1989 | Japan | 359/96 |
| WO90/05429 | 5/1990 | PCT Int'l Appl. | |
| 2226174 | 6/1990 | United Kingdom | 359/96 |

OTHER PUBLICATIONS

Huntley, IBM Tech. Disclosure Bull. 23(1), 347 (1980).

*Primary Examiner*—William L. Sikes
*Assistant Examiner*—Tai V. Duong
*Attorney, Agent, or Firm*—Herbert G. Burkard; Yuan Chao

[57] ABSTRACT

A liquid crystal projection display, having (a) a light source for producing light of at least two different primary colors; (b) an imaging element corresponding to each primary color light produced by the light source, each imaging element comprising plural pixel elements, each pixel element comprising liquid crystal composition dispersed in plural volumes in a containment medium and being independently addressable to primarily scatter light incident thereon in the absence of a sufficient electric field and to primarily transmit light incident thereon in the presence of a sufficient electric field; and (c) a lens for projecting light transmitted by each imaging element onto a screen; the liquid crystal composition in the pixel elements of the imaging element corresponding to the primary color light of longest wavelength including a pleochroic dye of a color complementary to the primary color light of longest wavelength, which pleochroic dye preferentially absorbs incident light which has not been scattered by the liquid crystal material in the absence of the sufficient electric field and transmits incident light in the presence of the sufficient electric field.

11 Claims, 6 Drawing Sheets

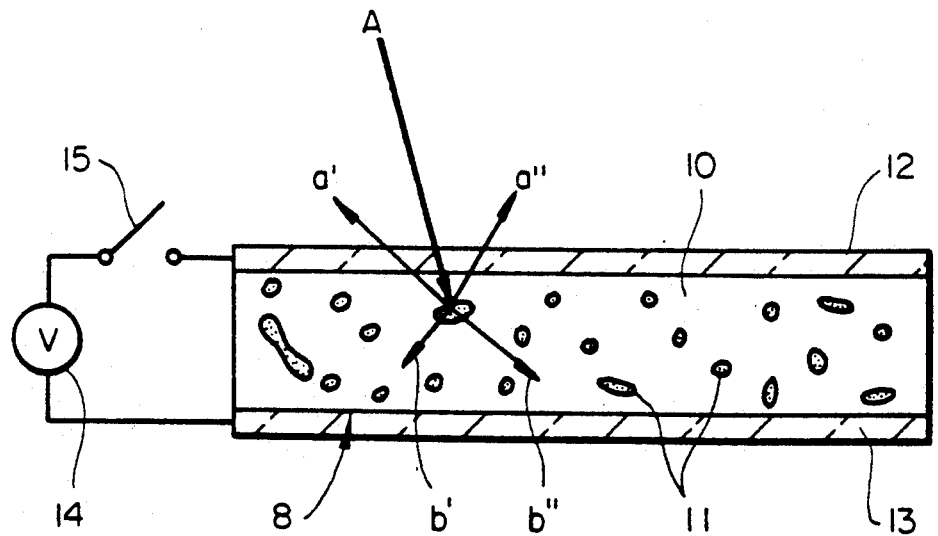
FIG_1
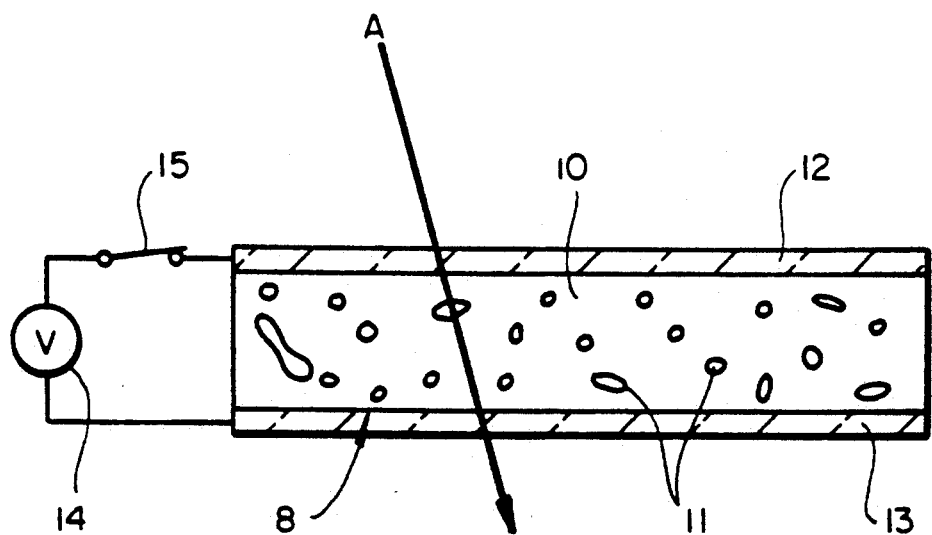
FIG_2

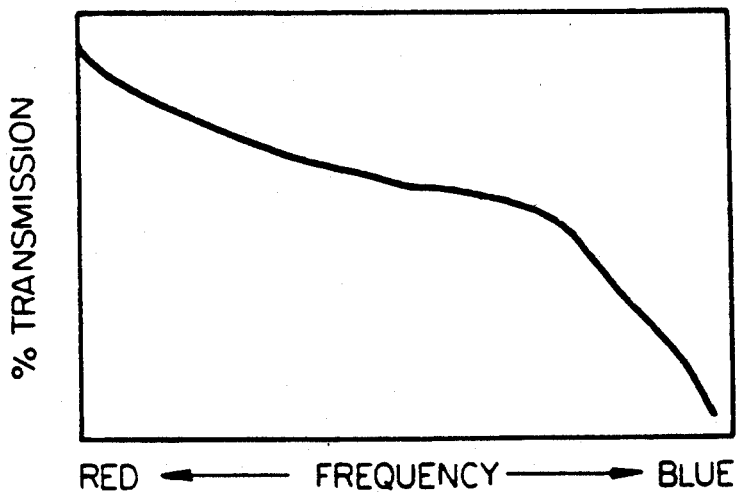
FIG_3a
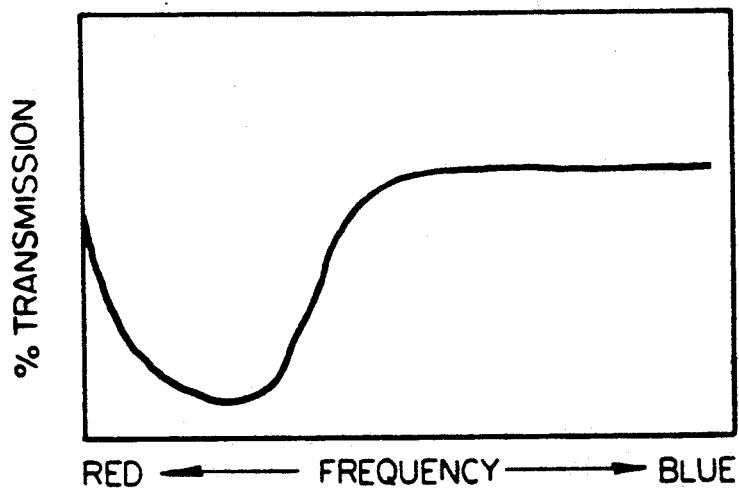
FIG_3b

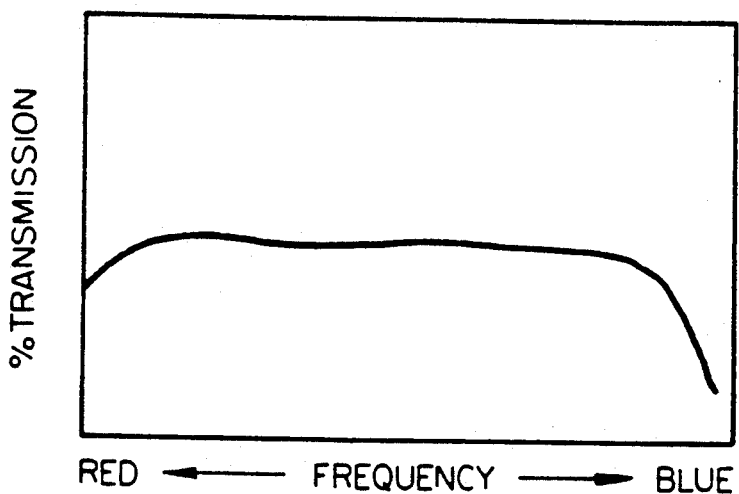
FIG_3c
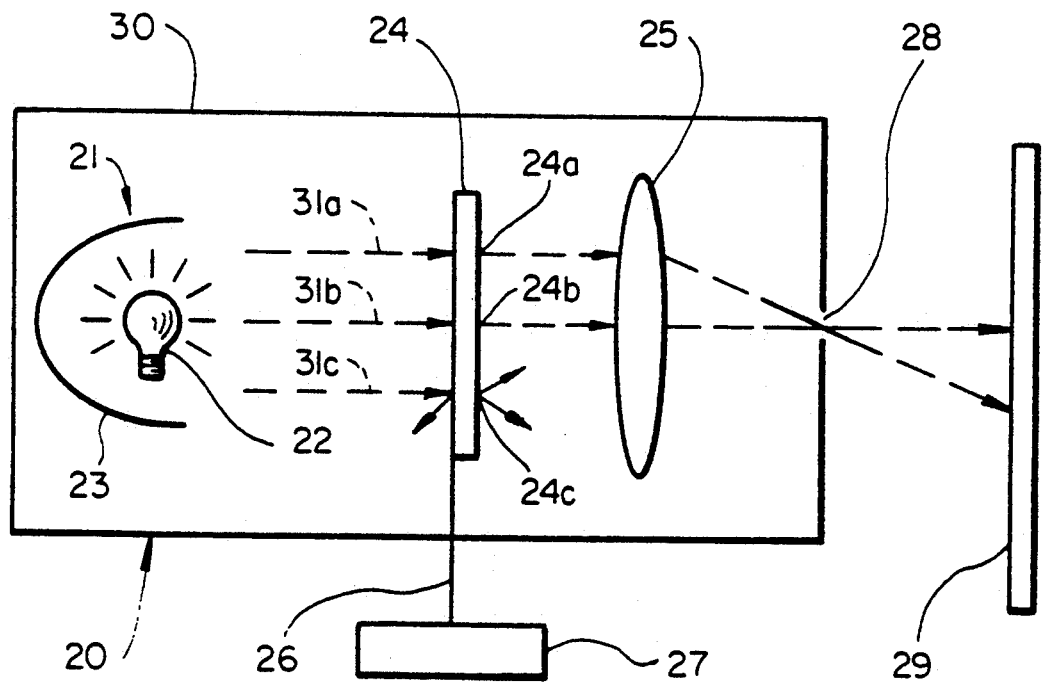
FIG_4

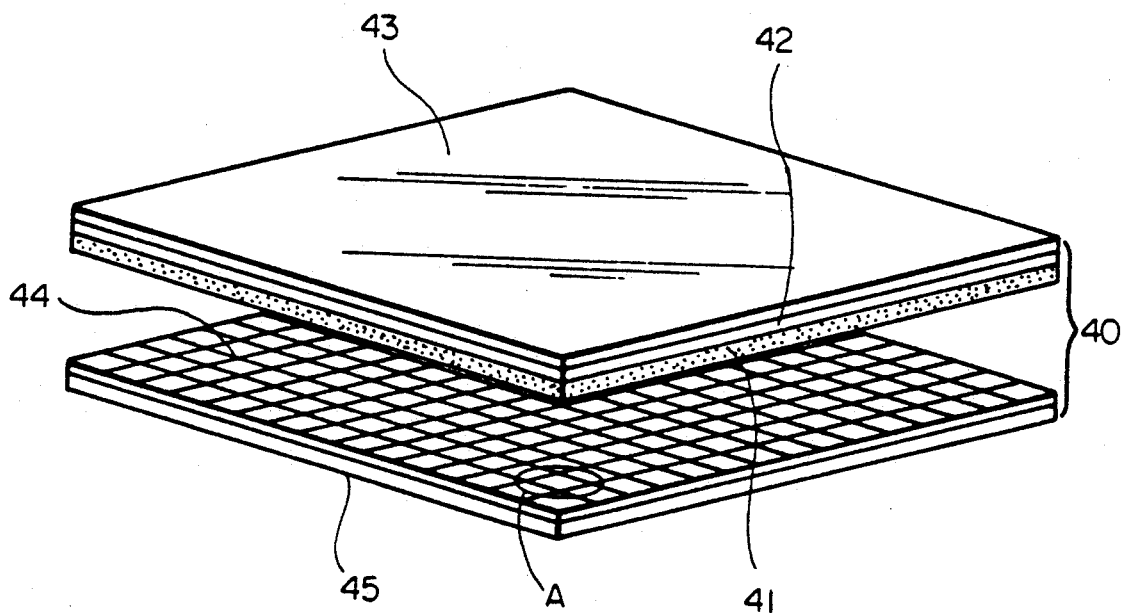
FIG_5a
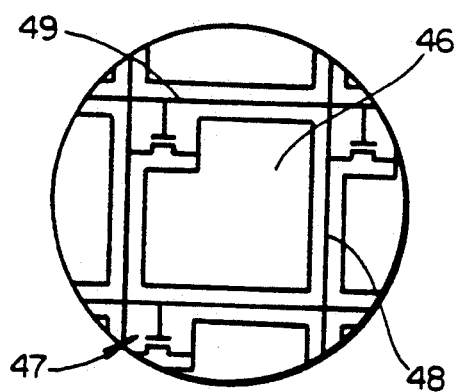
FIG_5b

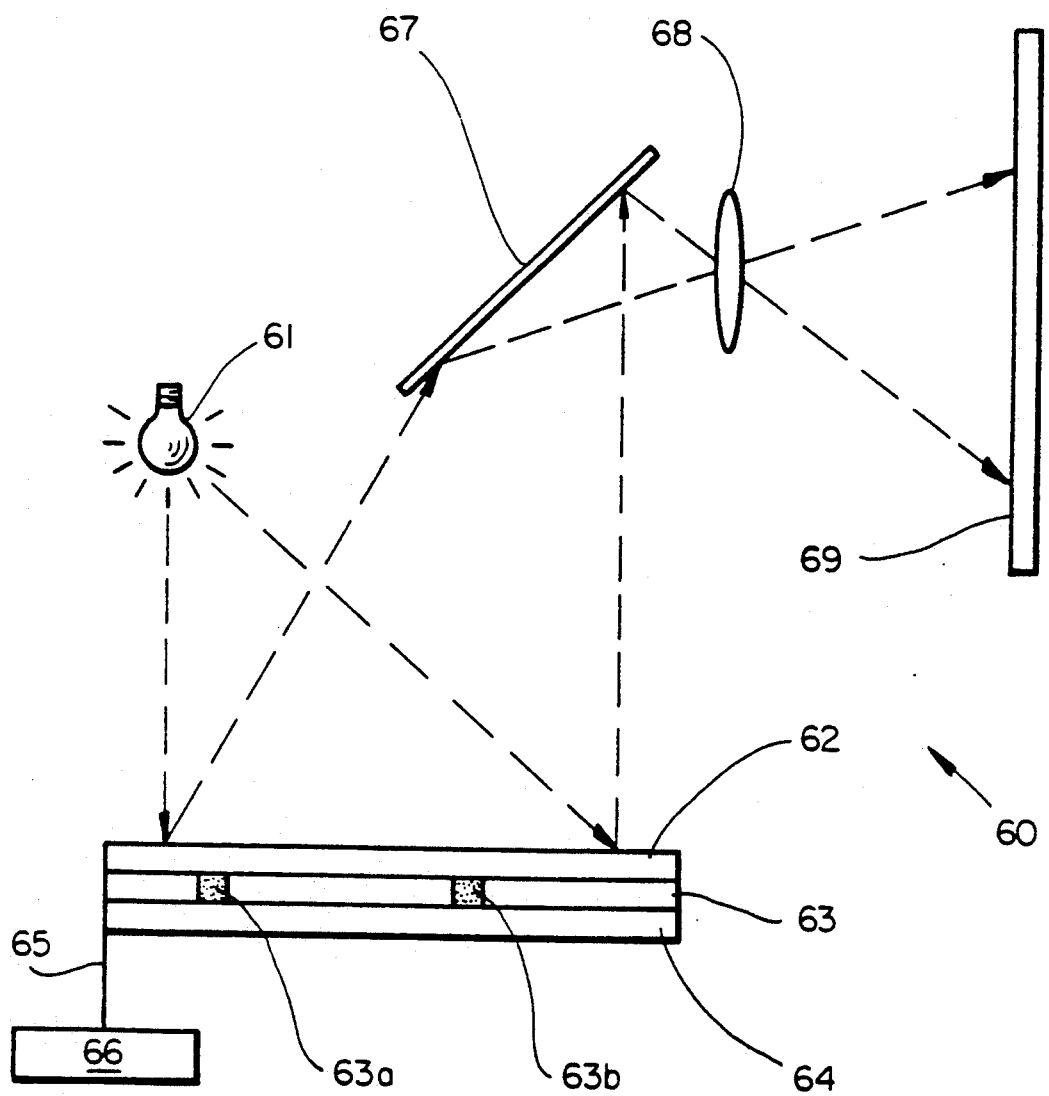
FIG_6

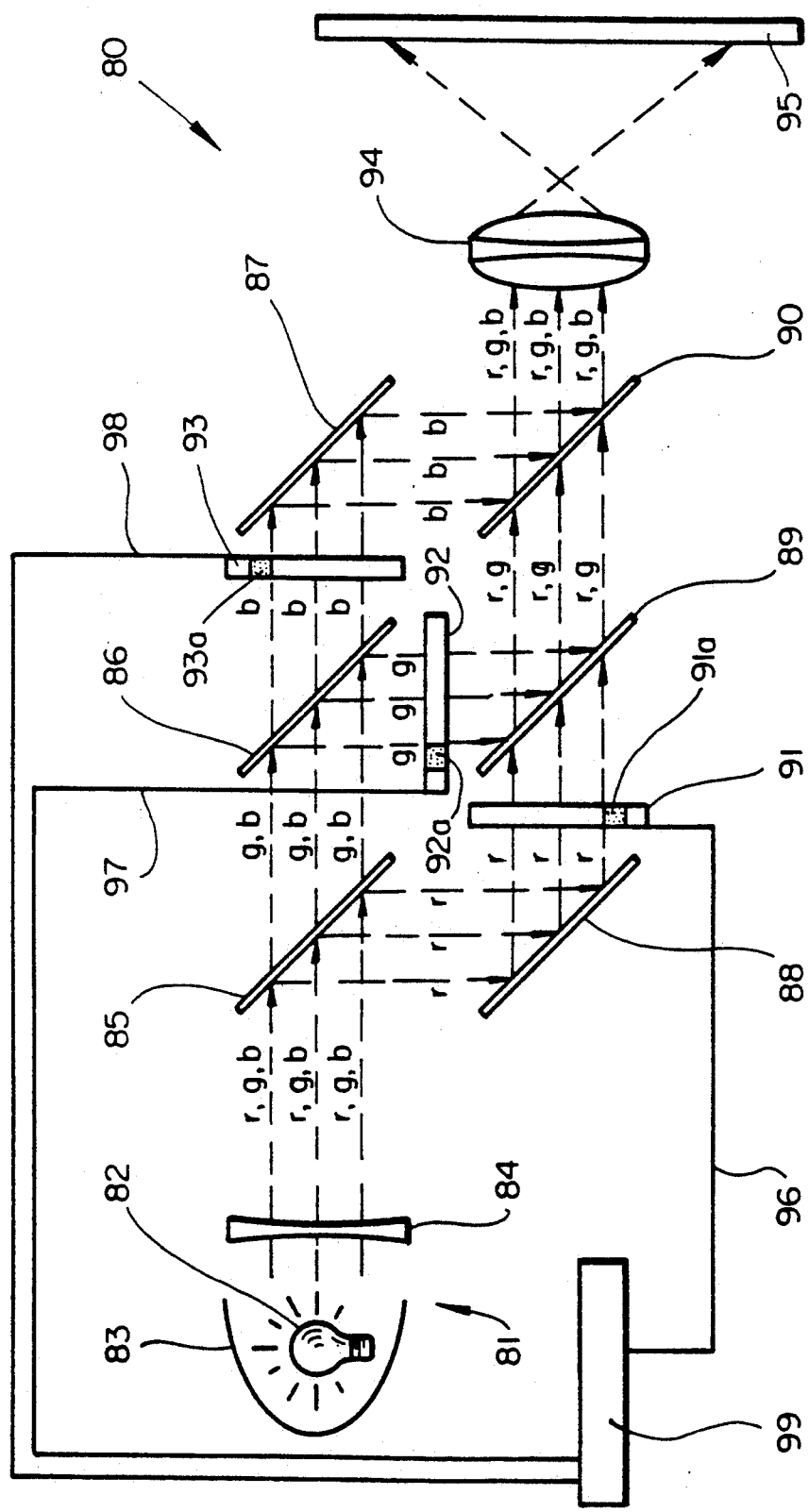
FIG_7

LIQUID CRYSTAL PROJECTION DISPLAY WITH COMPLEMENTARY COLOR DYE ADDED TO LONGEST WAVELENGTH IMAGING ELEMENT

TECHNICAL FIELD OF THE INVENTION

This invention relates to liquid crystal projection displays.

BACKGROUND OF THE INVENTION

Liquid crystal displays ("LCD's") and other devices in which the electro-optically active element comprises liquid crystal material are well known.

One type of device employs an encapsulated liquid crystal structure in which a liquid crystal composition is encapsulated or dispersed in a containment medium such as a polymer. When a voltage corresponding to a sufficiently strong electric field is applied via an electrode across the encapsulated liquid crystal structure (the "field-on" condition), the alignment of the liquid crystal molecules therein is re-oriented in accordance with the field, so that incident light is transmitted. Conversely, in the absence of such a voltage (the "field-off" condition) the alignment of the liquid crystal molecules is random and/or influenced by the liquid crystal-matrix interface, so that the structure scatters and/or absorbs incident light. The applied voltage at which the structure changes from its field-off condition to its field-on condition is generally referred to as the threshold voltage. Such devices can be used in displays, architectural partitions, automobile sun-roofs, privacy screens, and signs.

Among the displays which can be made are projection displays, in which the encapsulated liquid crystal structure forms an element which is used to control the projection of light onto a screen, such as an overhead projector for transparencies. Exemplary disclosures include Fergason, U.S. Pat. Nos. 4,613,207 (September 1986), 4,693,557 (September 1987), and 5,016,984 (May 1991); Williams et al., published PCT Application No. WO 90/05429 (May 1990); and Flasck, U.S. Pat. Nos. 5,022,750 (June 1991) and 5,024,524 (June 1991); the disclosures of which are incorporated herein by reference.

Naturally in such displays it is desirable to have as high a contrast ratio as possible. The scattering effect is particle size dependent, so that at the smaller median volume diameters at which the contrast ratio is useful, there is more scattering of light in the higher blue and green frequencies and less scattering in the shorter red frequencies, with the effect that the display appears unpleasantly reddish or brownish. This effect is most noticeable at intermediate voltages at which the display is not fully in the field-on or the field-off conditions, as for example when gray levels are being displayed, because off-neutral grays are more noticeable than an off-neutral black.

A related problem exists in colored displays, where separate elements comprising encapsulated liquid crystal structures are used to control light of different colors, typically three primary colors such as red, green, and blue. The contrast ratio for the green and the blue light controlling elements can be improved by optimizing the median volume diameter. But at such median volume diameters, the scattering effect for red light is diminished, so that the red light controlling element is a less efficient scatter compared to the blue and green ones, an undesirable result. One can increase the median volume diameter for the red light control element to increase its scattering efficiency, but this solution suffers from the drawback that the red contrast ratio is compromised. Also, it is an undesirable design complication to have differently constructed elements for the different colors. Another alternative is to increase the thickness of the encapsulated crystal layer in the red light control element, to increase the scattering of the red light, but this solution has its drawbacks, too. Increasing the thickness increases the threshold voltage, increasing the power requirements and making the device design undesirably complicated in that a different powering set-up is required for the red light element.

We have invented a display which overcomes the aforementioned limitations.

SUMMARY OF THE INVENTION

This invention provides a liquid crystal projection display, comprising (a) light source means for producing light;
(b) image forming means comprising plural pixel elements, each pixel element comprising liquid crystal material dispersed in plural volumes in a containment medium and being independently operable to primarily scatter light incident thereon in the absence of a sufficient electric field and to primarily transmit light incident thereon in the presence of a sufficient electric field, the liquid crystal composition including a pleochroic dye which, in the absence of the sufficient electric field, preferentially absorbs light in the spectral region in which the amount of light scattering by the image forming means is lowest and which, in the presence of the sufficient electric field, transmits such light, to thereby balance the color of the light scattered or transmitted by the image forming means; and
(c) lens means for projecting light transmitted by the image forming means onto a screen.

In another embodiment there is provided a liquid crystal projection display, comprising (a) light source means for producing light of at least two different primary colors;
(b) an image forming means corresponding to each primary color light produced by the light source means, each image forming means comprising plural pixel elements, each pixel element comprising liquid crystal material dispersed in plural volumes in a containment medium and being independently operable to primarily scatter light incident thereon in the absence of a sufficient electric field and to primarily transmit light incident thereon in the presence of a sufficient electric field; and
(c) lens means for projecting light transmitted by each image forming means onto a screen;

the liquid crystal composition in the pixel elements of the image forming means corresponding to the primary color light of longest wavelength including a pleochroic dye of a color complementary to the primary color light of longest wavelength, which pleochroic dye preferentially absorbs unscattered light in the absence of the sufficient electric field and transmits such light in the presence of the sufficient electric field.

BRIEF DESCRIPTION OF THE DRAWINGS

FIGS. 1 and 2 show schematically the operation of a device comprising an encapsulated liquid crystal structure.

FIGS. 3a-c show schematically how uneven scattering of light of different wavelengths may be corrected by inclusion of a pleochroic dye in accordance with this invention.

FIG. 4 depicts a projector of this invention.

FIGS. 5a-b depict an active matrix suitable for driving the image forming means of projectors of this invention.

FIGS. 6-7 depict additional projectors of this invention.

DESCRIPTION OF THE PREFERRED EMBODIMENTS

Encapsulated liquid crystal structures and their preparation are disclosed in U.S. Pat. Nos. 4,435,047 (1984), 4,606,611 (1986), 4,616,903 (1986), and 4,707,080 (1987), all to Fergason; published European patent application EP 156,615 (1985), by Pearlman et al.; U.S. Pat. No. 4,671,618 (1987), to Wu et al.; U.S. Pat. Nos. 4,673,255 (1987) and 4,685,771 (1987), to West et al.; U.S. Pat. No. 4,688,900 (1987) to Doane et al.; and published European patent application EP 0,313,053 (1989), by Dainippon Ink and Chemicals; the disclosures of which are incorporated herein by reference. In an encapsulated liquid crystal structure, discrete volumes of a liquid crystal composition are encapsulated, dispersed, embedded or otherwise contained in a containment medium or matrix. The volumes are not necessarily limited to spherical or substantially spherical ones. They may be irregularly shaped, and even interconnected. The amount of interconnection between volumes may be to an extent such that the liquid crystals appear to form a continuous phase, as described in the aforementioned EP 0,313,053. "Liquid crystal composition" denotes a composition having liquid crystalline properties, whether that composition consists of a single discrete liquid crystalline compound, a mixture of different liquid crystalline compounds, or a mixture of liquid crystalline and non-liquid crystalline compounds. In a preferred embodiment, the liquid crystal composition is nematic or operationally nematic, more preferably also having a positive dielectric anisotropy. In another preferred embodiment, the liquid crystal composition is operationally smectic. In yet another preferred embodiment, the liquid crystal composition is chiral nematic.

Individual liquid crystal molecules typically have elongated shapes, with a tendency to align or orient themselves with their long molecular axes parallel to each other. This alignment causes a liquid crystal composition to be anisotropic, meaning that its measured physical, optical, and other properties are dependent on the direction of measurement (parallel or perpendicular to the direction of alignment). Further, the alignment direction can be influenced by an external stimulus, such as an electrical or magnetic field, causing the liquid crystal composition to exhibit a particular value of a physical characteristic in one direction when the stimulus is absent, but rapidly switching to a different value when the stimulus is applied. It is because of this anisotropy and its ready realignment that liquid crystal compositions are useful as materials for displays.

The containment medium is preferably a polymeric material. Suitable containment media include but are not limited to poly(vinyl alcohol) and its copolymers, gelatin, polyurethane, poly(ethylene oxide), poly(vinyl pyrrolidone), cellulosic polymers, natural gums, acrylic and methacrylic polymers and copolymers, epoxies, polyolefins, vinyl polymers, and the like. Poly(vinyl alcohol) is a preferred containment medium.

Encapsulated liquid crystal structures can be formed by deposition from an emulsion containing both the containment medium and the liquid crystal composition, in the presence of a carrier medium. The emulsion may be made with a variety of apparatus, such a propeller blade mixers, colloid mixers, and the like. A field-reducing additive may be added to either the containment medium or the liquid crystal composition, or both, and either before or after the emulsion is formed, to make an encapsulated liquid crystal material responsive to lower electric fields, as described in copending, commonly assigned application Ser. No. 07/850,378; filed Mar. 10, 1992, by Wartenberg et al. Preferred emulsion techniques are taught in U.S. Pat. Nos. 4,435,047 (1984), 4,606,611 (1986), 4,616,903 (1986), and 4,707,080 (1987), all to Fergason; Pearlman et al., U.S. Pat. No. 4,992,201 (1991); and copending, commonly assigned applications of Wartenberg et al., Ser. No. 07/834,438, filed Feb. 12, 1992 and of Reamey, Ser. No. 07/865,435; filed Apr. 9, 1992; the disclosures of which are incorporated herein by reference.

Encapsulated liquid crystal structures can also be made by phase separation techniques. In one embodiment, a solvent is evaporated from a homogeneous solution containing both containment medium and the liquid crystal composition. In another embodiment, an initially homogeneous mixture containing both containment medium and liquid crystal composition is heated to an elevated temperature, then cooled to phase-separate out liquid crystal volumes contained in the containment medium. Further, it can be formed by an in-situ polymerization process, in which a precursor of containment medium (e.g., a polymerizable monomer) is polymerized and simultaneously encapsulates a liquid crystal composition as it phase separates. The liquid crystal composition need not be entirely surrounded by the polymer, and may exist as part of a system with co-continuous phases. Preferred phase separation techniques are taught in U.S. Pat. No. 4,671,618 (1987), to Wu et al.; U.S. Pat. Nos. 4,673,255 (1987) and 4,685,771 (1987), to West et al.; U.S. Pat. No. 4,688,900 (1987) to Doane et al.; and published European patent application EP 0,313,053 (1989), by Dainippon Ink and Chemicals, the disclosures of which are incorporated herein by reference.

Generally, an encapsulated liquid crystal structure is substantially non-transparent in the absence of a sufficient electric field (the "field-off" state) and substantially transparent in the presence of a sufficient electric field (or "field-on" state). The electric field induces a change in the alignment of the liquid crystal molecules in the liquid crystal composition, in turn causing the encapsulated liquid crystal structure to switch from a highly light-scattering (and/or absorbent) state to a highly non-scattering and substantially transparent state. Generally, it is preferred that the liquid crystal composition have a positive dielectric anisotropy and that the ordinary index of refraction of the liquid crystal composition be matched with the index of refraction of the containment medium, while the extraordinary index of refraction is substantially mismatched therewith. There is further scattering which may occur due to the different liquid crystal alignments in neighboring droplets. If this is the dominant mode of scattering, the requirement for refractive index matching may be relaxed. The physical principles by which such encapsulated liquid crystal structures operate are described in further detail in the aforementioned references, particularly the patents to Fergason. In those portions of the encapsulated liquid crystal structure to which a sufficient electric field is applied, the transition from a non-transparent state to a transparent state occurs, while adjacent areas to which no electric field has been applied remain non-transparent.

The principle of operation of an encapsulated liquid crystal structure is illustrated in FIGS. 1 and 2 (like numerals referring to like elements). Encapsulated liquid crystal structure 8 comprises a containment medium 10 having distributed therein plural volumes of liquid crystal composition 11 and is positioned between top and bottom electrodes 12 and 13, made for example of indium tin oxide ("ITO") or a thin metal coating. A voltage source 14 is connected to electrodes 12 and 13, but with switch 15 in the open position (FIG. 1), no voltage is applied across encapsulated liquid crystal material 8. Incident light (ray A) is scattered, both backward (rays a' and a") and forward (b' and b"). When switch 15 is closed (FIG. 2), a voltage is applied across encapsulated liquid crystal material 8, causing molecules in liquid crystal compostion 11 to align their long molecular axes with the field of the applied voltage. Owing to the match between the index of refraction of containment medium 10 and the ordinary index of refraction of liquid crystal composition 11, incident light (ray A) is not scattered, but is transmitted through encapsulated liquid crystal structure 8.

It is known to mix pleochroic dyes with liquid crystals to form a solution therewith and form a colored liquid crystal display. The molecules of pleochroic dyes generally align with the molecules of liquid crystals, so that the application of the electric field affects not only the predominant alignment of the liquid crystals, but also of the pleochroic dye. As the extent of the absorption of incident light by the pleochroic dye depends on its orientation relative to the incident light, the application of an external stimulus to a liquid crystal-pleochroic dye combination provides a mechanism for the controlled attenuation of light by absorption. (Thus, as used herein, the term "liquid crystal composition" also means, in context, a liquid crystal composition containing pleochroic dye dissolved therein.) In the absence of a sufficient electric field, the pleochroic dye is, on the average, disposed in an orientation in which is substantially absorbs incident light. When a sufficient electric field is applied, the the liquid crystal and pleochroic dye molecules re-orient themselves in alignment with the electric field. In this orientation, the pleochroic dye primarily transmits incident light.

FIGS. 3a-c show schematically how inclusion of an appropriate pleochroic dye can be used to make an encapsulated liquid crystal display which is color-balanced in both the scattering and transmissive modes. FIG. 3a represents the visible light transmission spectrum of an encapsulated liquid crystal display element without any added pleochroic dye, in the absence of a sufficient electric field—that is, in its field-off or scattering mode. Incident light is primarily scattered, but there is some light transmitted. Scattering is less efficient in the lower frequency red wavelengths, so that the transmitted light has a red or brownish tint to it. FIG. 3b shows the transmission and corresponding absorption spectra of a pleochroic dye selected to absorb strongly in the red spectral region, i.e., a bluish dye such as a cyan dye. The dye preferably has an absorption maximum between 550 and 700 nm, more preferably between 580 and 650 nm. The inclusion of such a pleochroic dye into the liquid crystal material results in the encapsulated liquid crystal structure having a resultant transmission spectrum given by FIG. 3c, so that the transmitted light is more color-balanced (neutral). When a sufficient electric field is applied, the encapsulated liquid crystal structure adopts its transmissive, non-scattering state and the pleochroic dye adopts its transmissive (less absorbing) orientation. The net effect is that the display is also more color balanced in the scattering state.

It is to be noted that the problem to which this invention relates cannot be solved by simply including an isotropic (non-pleochroic) dye in the liquid crystal material. In the field-off state, the isotropic dye can color-correct the residually transmitted light, but would keep on absorbing in the field-on state, with the result that in the field-on state the display would not be color balanced—it would appear bluish. Further, we have unexpectedly found that when gray shades are being depicted, color balancing is also better.

FIG. 4 is a schematic representation of a projector embodying the present invention. Projector 20 has a light source means 21 comprising a light source 22 and a parabolic reflector 23 for directing collimated light (rays 31a, 31b, and 31c) towards panel 24 comprising encapsulated liquid crystal structure containing a pleochroic dye as described above. Alternatively or additionally, a lens (not shown) between light source 22 and panel 24 can be used for collimating and directing the light. Light is either primarily scattered and/or absorbed or primarily transmitted by panel 24. Control of which pixel elements of panel 24 are to be in a scattering or transmissive state, in order to form an image, is effected by electric drive means 27, connected to panel 24 by lead 26. In the figure, pixel elements 24a and 24b of panel 24 are shown as being in the transmissive (field-on) state while pixel element 24c is shown in the scattering/absorbing state. (Those skilled in the art will understand that in actuality the number of pixel elements will be much larger than those depicted herein, especially in the case of high resolution displays, only three being shown merely for simplicity of illustration.) Consequently, rays 31a and 31b are transmitted through panel 24, while ray 31c is scattered (both forwards and backwards) and/or absorbed by the pleochroic dye. Rays 31a and 31b are focussed by lens means 25 onto projection screen 29, where the viewing image is formed. An optional aperture means 28 serves to help block light which has been forwardly scattered by panel 24 (e.g., from ray 31c) reaching projection screen 29. Aperture means 28 may be integral with a housing 30, which also serves to contain the other components of the projector. Because panel 24 contains the pleochroic dye, both the light transmitted or scattered and/or absorbed by panel 24 are color-balanced.

The addressing of the pixel elements 24a-c can be controlled by active matrix switching means such as thin film transistors (TFT's) or metal-insulator-metal diodes. Preferably, they are addressed in a multiplex fashion, using an array of multiplexed active matrix switching means may be employed. Such a scheme is illustrated in FIGS. 5a-b, in an exploded view, with TFT's as the active matrix switching elements. FIG. 5a depicts a sandwich 40 of encapsulated liquid crystal structure 41 between a first support material 43 (e.g., glass) coated with a transparent ground plane electrode 42 (made for example from ITO) and a second support material 45 (typically glass) having thereon an array 44 of multiplexed TFT's. The construction of the array is shown in greater detail in FIG. 5b, corresponding to a magnification of the portion of FIG. 5a labelled A. Each pixel is defined by an electrode 46 (made for example from ITO). The application of a voltage across each electrode 46 is controlled by a TFT 47. In turn, each TFT is addressed in a multiplexed fashion via scan line 49 and data line 48. The TFT serves to control the addressing of each pixel and prevent cross-talk between adjacent pixels. Such a multiplexing method is called active matrix multiplexing.

An alternative, but less preferred multiplexing method is passive multiplexing, using a set of M row electrodes in conjunction with a set of N column electrodes. By applying the proper electrical signals to, for example, the 5th row and 8th column electrodes, the pixel at the 5th row and 8th column can be switched on and off. In this way, the number of electrode leads can be reduced from M×N to M+N. However, the adjacent pixels are not independent of each other. When a voltage sufficient to switch the 5th row-8th column pixel is applied, the adjacent pixels (e.g., the 4th row-8th column pixel) also experience a substantial voltage and can also be inadvertently switched, at least partially, leading to cross-talk.

FIG. 6 shows another (reflector) of this invention. Projector 60 is a double or compound folded projector in which light from light source 61 is directed onto Fresnel lens 62. The light is preferably collimated by lens 62 and directed onto imaging means 63, comprising encapsulated liquid crystal material and pixel elements (e.g., 63a and 63b) which are independently switchable between a scattering and transmissive state. As to those pixel elements which are in the transmissive state, the same being determined electric drive 66, which is shown as a computer couple by an electrical connector 65 to the electrodes of imaging means 63, such collimated incident light will transmit through to back plane reflector 64 and be reflected back through the transmitting pixel elements to Fresnel lens 62. Light focused by Fresnel lens 62 is reflected by reflector 67 to projection lens 68 which then projects the reflected light to form an image on screen 69. The construction of such a display, as well as an alternative embodiment in which the light source is positioned behind the imaging means and the back plane reflector is dispensed with, is described further detail in Fergason, U.S. Pat. No. 4,613,207 (1986), the disclosure of which is incorporated by reference. In a preferred embodiment, back plane reflector 64 can be a reflective silicon wafer including active matrix elements for addressing the pixel elements, such as described by Huntley, in IBM Tech. Disclosure Bull. 23, No. 1, pp. 347-8 (1980), the disclosure of which is incorporated by reference.

FIG. 7 shows a colored display according to this invention. Projector 80 has a light source means 81 for producing collimated white light, comprising a light emitter 82 (which may be for example a quartz halogen or xenon short arc lamp), reflector 83 and subsidiary lens 84 (optional). White light (having red, blue, and green components, labeled r, g, and b, respectively and shown as three parallel rays) from light emitter 82 is collimated and directed in the direction of dichroic filter mirrors 85, 86, and 87 by reflector 83 and lens 84. First dichroic filter mirror 85 reflects the red but transmits the green and blue components. The green and blue components are further separated by dichroic filters 86 and 87, which reflect green and blue, respectively. Since the light incident on dichroic filter mirror 87 has only a blue component, it may be replaced if desired with a plain mirror. The three transversely separated red, green, and blue components are later recombined via dichroic filter mirrors 88, 89, and 90 to direct the recombined light towards projection lens 94. Dichroic filter mirror 88 is red reflective; dichroic filter mirror 89 is green reflective, but permits red light to pass through; and dichroic filter mirror 90 is blue reflective, but permits red and green light to pass through. (Because only red light is incident on dichroic filter 88, it may be replaced if desired by a plain mirror.) Intercepting the transversely separated beams are switchable image forming elements 91, 92, and 93, made of encapsulated liquid crystal material as described hereinabove. During operation image forming elements 91, 92, and 93 have pixels (representative ones being identified by numerals 91a, 92a, and 93a) which are independently switchable between light transmitting and scattering states, so as to form images and controllably allow red, green, or blue light to reach lens 94. Lens 94 then projects the image onto screen 95. Drive means 99 is connected to image forming elements 91, 92, and 93 by leads 96, 97, and 98, respectively, and multiplexably drives them, for example via an active matrix array as described hereinabove.

To provide proper color balance, the liquid crystal material in image forming means (and its pixels) 91 contains a pleochroic dye of a color complementary to the red light, i.e., cyan. In a preferred embodiment, the liquid crystal material in image forming means 92 contains a pleochroic dye of a color complementary to the green light, i.e., magenta. While green light is more highly scattered by the encapsulated liquid crystal structure than red light, it is nevertheless less highly scattered than the blue light, leaving a slight imbalance between the green and blue components. Correcting for this imbalance with the magenta dye provides further optimization of the colors.

While the instant invention has been illustrated with reference to certain particular projection display designs, those skilled in the art will appreciate that it is equally applicable to other projection display designs, mutatis mutandis.

Those skilled in the art will appreciate that, instead of the combination of a white light source and dichroic filters for creating the transverse red, green, and blue light components, other designs, such as using three separate light sources, one each for red, blue, and green light can be used. They will also appreciate that while in this instance the invention has been exemplified using the more common combination of the three primary colors red, green, and blue, other combinations using more or less primary colors and/or other primary colors can be used, for example, the complementary set cyan, magenta, and yellow, and that, in such instances, the choice of pleochroic dye will be correspondingly changed.

As an illustration of the invention, two emulsions were made from liquid crystal E7 (E. Merck) in 10% poly(vinyl alcohol) (Vinol 205 from Air Products) in water. In one instance the E7 liquid crystal did not contain any added dye. In the other instance, the E7 liquid crystal contained 0.144 wt % of the blue dyes M403 and M137 (69.5:30.5 w:w ratio, both from Mitsui) dissolved in it. The ratio of liquid crystal to poly(vinyl alcohol) was 83:17 in each case. The emulsions were coated onto indium tin oxide (ITO) coated polyester films, dried, and then laminated with ITO coated polyester films to produce test cells.

The cells were placed in a white light projector with a quartz-halogen lamp. The CIE 1931 color coordinates of the cell images were measured in the scattering off-state (no voltage applied) and in the clear on-state (70 V applied), using a Pritchard 1980A photometer. The comparative results are shown in the following table.

| Sample | Cell on $x_{off}$ | $y_{off}$ | Cell on $x_{on}$ | $y_{on}$ | Color shift $\Delta r_{on\text{-}off}$ | Color shift $\Delta r_{source\text{-}off}$ |
|---|---|---|---|---|---|---|
| No dye | 0.437 | 0.428 | 0.423 | 0.432 | 0.015 | 0.037 |
| With dye | 0.422 | 0.431 | 0.419 | 0.430 | 0.003 | 0.022 |

$x_{source} = 0.400$; $y_{source} = 0.431$ $$\Delta r_{1\text{-}2} = \sqrt{(x_1 - x_2)^2 + (y_1 - y_2)^2}$$

The image of the cell without the dye was noticeably brownish-yellow in the off-state, as indicated by its color coordinates, but not in the on-state. It can be seen that the color shift from the off-state to the on-state has been reduced by a factor of 5, and the difference between the off-state and the color source has been halved by the addition of the dye.

From Brown, "Color discrimination of twelve observers," *J. Opt. Soc. Am.*, 47, 137 (1957), the resolution of color difference in this region of the color space is around $\Delta r-=-0.005$. The addition of the dye has made negligible the color difference between the on- and off-states.

What is claimed is:

1. A liquid crystal projection display, comprising
   (a) light source means for producing light of at least two different primary colors;
   (b) an image forming means corresponding to each primary color light produced by the light source means, each image forming means comprising plural pixel elements, each pixel element comprising liquid crystal composition dispersed in plural volumes in a containment medium and being independently addressable to primarily scatter light incident thereon in the absence of a sufficient electric field and to primarily transmit light incident thereon in the presence of a sufficient electric field; and
   (c) lens means for projecting light transmitted by each image forming means onto a screen; the liquid crystal composition in the pixel elements of the image forming means corresponding to the primary color light of longest wavelength including a pleochroic dye of a color complementary to the primary color light of longest wavelength, which pleochroic dye preferentially absorbs incident light which has not been scattered by the liquid crystal material in the absence of the sufficient electric field and transmits incident light in the presence of the sufficient electric field.

2. A liquid crystal projection display according to claim 1, wherein the light source means comprises a white light source and dichroic mirror means for splitting the white light produced by the white light source into at least two primary colors.

3. A liquid crystal projection display according to claim 1, wherein the light source means comprises a plurality of primary light sources, each producing light of a different primary color.

4. A liquid crystal projection display according to claim 1, wherein the light source means produces light of three primary colors.

5. A liquid crystal projection display according to claim 4, wherein the the primary colors are red, blue, and green.

6. A liquid crystal projection display according to claim 5, wherein the pleochroic dye is a cyan dye.

7. A liquid crystal projection display according to claim 5, wherein the pleochroic dye has an absorption maximum in between 550 nm and 700 nm.

8. A liquid crystal projection display according to claim 4, wherein the liquid crystal composition in the image forming means corresponding to the primary color of second longest wavelength includes a pleochroic dye of a color complementary to the primary color of second longest wavelength, which pleochroic dye preferentially absorbs incident light which has not been scattered by the liquid crystal material in the absence of the sufficient electric field and transmits incident light in the presence of the sufficient electric field.

9. A liquid crystal projection display according to claim 1, wherein the liquid crystal composition in the image forming means is operationally nematic and has a positive dielectric anisotropy.

10. A liquid crystal projection display according to claim 1, wherein the pixel elements are addressed via thin film transistors or metal-insulator-metal diodes.

11. A liquid crystal projection display according to claim 1, wherein the pixel elements are addressed by passive multiplexing.

* * * * *